(No Model.) 2 Sheets—Sheet 1.
T. DANIELS.
CONFECTIONERY AND PILL COATING AND PILL ROUNDING MACHINE.
No. 278,780. Patented June 5, 1883.
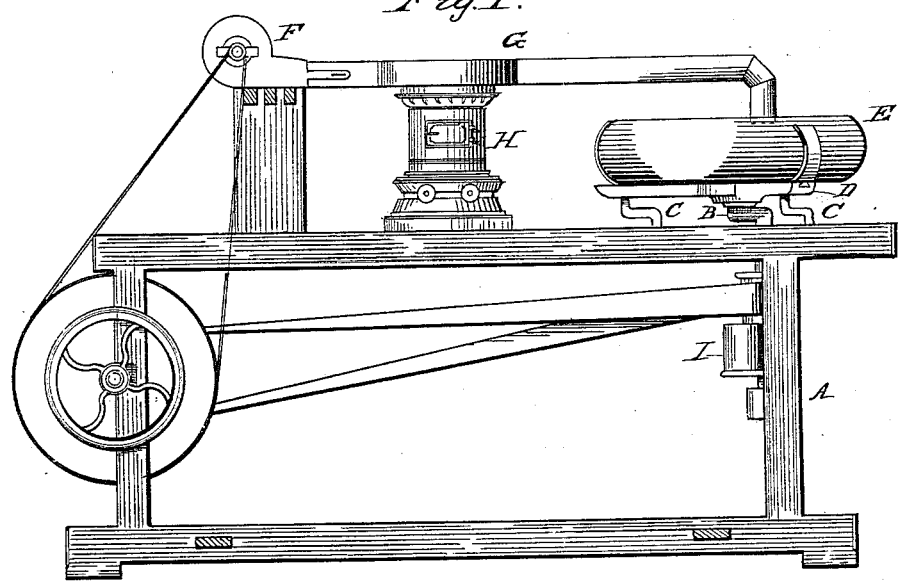
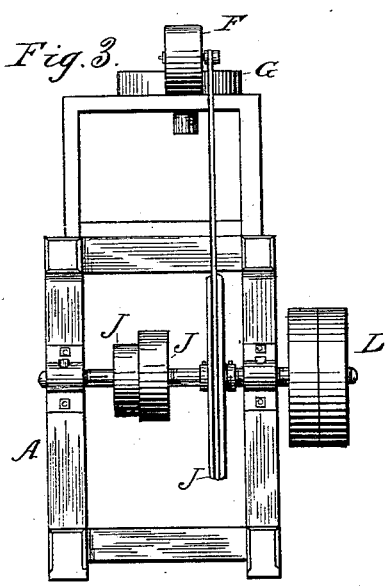
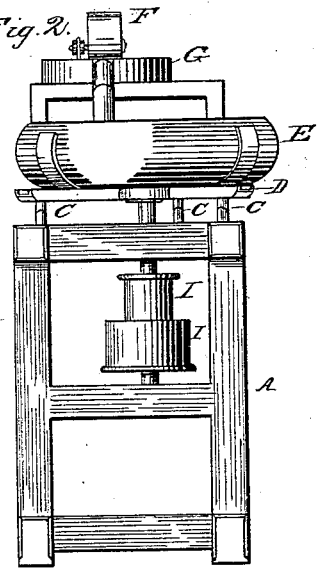
Witnesses
J. W. Reynolds, Jr.
J. A. Banford.
Inventor:
Thomas Daniels (No Model.)   2 Sheets—Sheet 2.

T. DANIELS.
CONFECTIONERY AND PILL COATING AND PILL ROUNDING MACHINE.

No. 278,780.   Patented June 5, 1883.

Witnesses:
J. W. Reynolds Jr.
J. A. Sanford

Inventor.
Thomas Daniels

UNITED STATES PATENT OFFICE.

THOMAS DANIELS, OF TOLEDO, OHIO.

CONFECTIONERY AND PILL COATING AND PILL-ROUNDING MACHINE.

SPECIFICATION forming part of Letters Patent No. 278,780, dated June 5, 1883.

Application filed December 28, 1882. (No model.)

*To all whom it may concern:*

Be it known that I, THOMAS DANIELS, a citizen of the United States, residing at Toledo, in the county of Lucas, in the State of Ohio, have invented a new and useful Confectionery and Pill Coating and Pill-Rounding Machine; and I do hereby declare that the following is is a full, clear, and exact description of the construction and operation of the same, reference being had to the several drawings, making a part of this specification, in which each separate part or section is designated by a letter.

My invention consists of a machine for coating confectionery or pills with sugar or any substance suitable for using in processes of that description, also to round and finish by rotating a rough or imperfectly-formed lot of pills.

It consists of a movable pan, a tripod supporting the pan, an upright shaft, three supporting-cranks operating and supporting the tripod, and a blower with a device for heating and conveying a current of warm or cold air into the movable pan while the pan is in motion. I attain these objects by the mechanism illustrated in the accompanying drawings.

Figure 6:
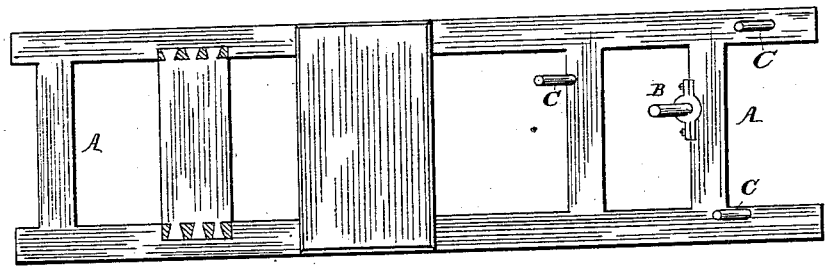
Figure 9:
Figure 7:
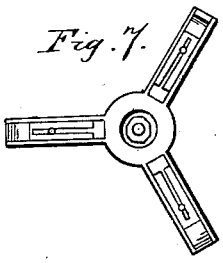
Figure 8:
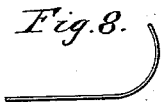
Figures 4, 5:
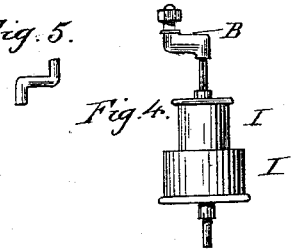

Figure 1 is a side elevation of the machine. Fig. 2 is an end view of the machine, showing pan and moving devices. Fig. 3 is an end view, showing pulleys. Fig. 4 is an elevation of the upright shaft. Fig. 5 is a profile view of the supporting-cranks C C C. Fig. 6 is a top view of the frame, showing the cranks in place. Fig. 7 is a plan of a tripod. Fig. 8 is a profile of clamps. Fig. 9 is a plan of an air-tube attached to a blower.

Similar letters refer to similar parts throughout the different views.

A A is the frame-work supporting the machine. B is an upright shaft provided with pulleys. C C C are supporting-cranks; D, the tripod. E is a movable pan. F is a blower. G is an air-tube. H is a heating apparatus. I I are pulleys on the upright shaft B. J J J are driving-pulleys. K is a driven pulley, and L a loose pulley.

B, the upright shaft provided with pulleys I I, is about two feet in length and about two inches in diameter, with a crank at the top, which has a radius of four inches, more or less. This crank works in a journal in the center of the tripod D.

C C C are three supporting-cranks, upon which the outer ends of the tripod rest, and are about eight inches in height and one inch (more or less) in diameter, and their radii are equal in length to the radius of the crank on the shaft B. The lower ends of the supporting-cranks are fitted into journals in the frame A A, and the upper ends are fitted into journals on the under side, near the outer ends of the tripod D, and serve as supports to the tripod, and in connection with the shaft B to impart a horizontal gyrating motion to the tripod D and pan E.

D, the tripod, is made of metal or any suitable material, with three arms projecting outward from the center. The arms are sixteen inches (more or less) in length by about two inches in width and about half an inch in thickness, with the outer ends equidistant. It is provided with a journal in the center, into which the crank-pin of the upright shaft B is fitted. Journals are also provided on the under side, near the outer ends of the arms of the tripod. The arms of the tripod are provided with suitable set-screws, by which the clamps are held in such position as may be required. The clamps thus provided are made of metal, and are in shape to fit the pan E. The clamps are pressed firmly against the sides of the pan, and thus hold the pan securely in position.

E is a movable pan, made of sheet-copper or any suitable metal, is round in form, with flat, concave, or convex bottom, as may be required. The sides may be straight or curved, raised seven inches, more or less, in height. It is two feet (more or less) in diameter, as shall be found necessary.

F is a blower, of any suitable construction, having capacity for producing a rapid current of air. The blower may or may not be isolated from the machine; but, having the air-tube G leading to the pan E, one blower may be sufficient to supply a current of air to several machines.

G is a metal tube or device for conveying the current of air from the blower F to the pan E. It is made flat, one inch (more or less) in height, and enlarged near the center to a width of ten inches, more or less, and tapering toward both ends to the size of about two inches in diameter. This device is supplied with heat from a small portable furnace or stove, H; or the tube may be made of the size of about two inches in diameter the entire length, and incased in an outside tube, forming a steam-jacket, into which steam could be introduced, and heat thereby conveyed to the air-tube.

By means of this device or mechanism the tripod D and movable pan E are operated by the upright shaft B, giving them a horizontal gyrating movement, wherein the movable pan E moves in a circle the radius of which is about four inches, and any given point on the outside of the pan continues to be directed toward a certain point of the compass—that is to say, if the direction indicated by a point on the outside and the center of the pan E be north, it will continue to be north during the entire and successive gyrations of the pan. Confectionery or pills contained in the pan E are caused to rotate in as rapid manner as is desired, and while thus in motion the materials usually used in the process of coating confectionery or pills are gradually added, according to the discretion of the operator, till a sufficient coating is obtained. In the process of coating, as desired by the operator, a current of warm or cold air is directed into the pan E, by which means a rapid drying of the liquid portions of the coating is produced.

Pills partially rounded in a rough and unfinished condition while of a soft or suitable consistence may be rotated in the same manner as pills in the process of coating, which will give them a round, smooth, and finished appearance. A current of air may also be used when it is desired to dry the pills. In this manner the pills will in a short time be dried sufficiently for coating or for any other use.

The machine has motion imparted to it by the pulley K from any suitable power.

Having fully explained my invention, what I desire to claim and to secure by Letters Patent of the United States is—

1. In a confectionery and pill coating and pill-rounding machine, a pan or other suitable vessel for containing the pills and suitable mechanism for imparting to the pan a gyrating or circular motion without causing said pan to turn on its own axis, substantially as set forth.

2. In a confectionery and pill coating and pill-rounding machine, a suitable pan or vessel for containing the pills to be coated or rounded and suitable mechanism for imparting to the pan a combined vibratory and reciprocating motion without causing said pan to rotate on its central axis, substantially in the manner described, and for the purposes specified.

3. In a confectionery and pill coating and pill-rounding machine, a pan or other suitable vessel for containing the substance to be operated upon, with suitable mechanism for imparting to said pan a shaking, oscillating motion, substantially as set forth.

4. In a confectionery and pill coating and pill-rounding machine, a pan mounted on two or more independent cranks, and receiving its motion from a crank attached to a revolving shaft, as set forth.

5. In a confectionery and pill coating and pill-rounding machine, a pan for containing the pills or confectionery, mounted on a tripod, D, cranks C, and shaft B, substantially as described.

6. In a confectionery and pill coating and pill-rounding machine, a blower and pipes for conveying hot or cold air directly to the pills for cooling or drying the same, substantially as described.

7. In a confectionery and pill coating and pill-rounding machine, the combination, with a blower and pipe for conveying air to the pills, of a furnace for heating the air in said pipe, substantially as described.

8. In a confectionery and pill coating and pill-rounding machine, the combination, with the tripod, of suitable adjustable clamps for holding the pan on the tripod, substantially as set forth.

9. In a confectionery and pill coating and pill-rounding machine, the combination of the shaft and crank B with the tripod D and supporting-cranks C C C to produce the motion described, for the purposes specified.

10. In a confectionery and pill coating and pill-rounding machine, the combination of the blower F, the air-tube G, the movable heating apparatus H, and the movable pan E, substantially as described, for the purposes specified.

THOMAS DANIELS.

Witnesses:
J. A. SANFORD,
EDM. V. DELPHEY.